United States Patent
Jones

[15] 3,707,076
[45] Dec. 26, 1972

[54] LOAD-REGISTRY DEVICE
[72] Inventor: Keith W. Jones, Houghton, Mich.
[73] Assignee: Northern Technical Services, Inc., Laurium, Mich.
[22] Filed: May 4, 1970
[21] Appl. No.: 34,260

[52] U.S. Cl. ..................................73/141 A, 177/211
[51] Int. Cl. ..............................G01l 1/00, G01l 3/10
[58] Field of Search.....73/141 A, 133, 88.5; 177/211

[56] References Cited

UNITED STATES PATENTS

| | | | |
|---|---|---|---|
| 3,370,296 | 2/1968 | Greenberg | 364/14 |
| 3,103,984 | 9/1963 | Ellis | 177/211 |
| 2,642,741 | 6/1953 | Du Pont | 73/167 |
| 2,736,549 | 2/1956 | Paul | 265/55 |
| 3,427,875 | 2/1969 | Saxl | 73/141 |

FOREIGN PATENTS OR APPLICATIONS

| | | | |
|---|---|---|---|
| 177,602 | 12/1961 | Sweden | 73/141 |
| 813,318 | 9/1954 | Germany | 73/141 |
| 1,311,623 | 0/1961 | France | 73/141 A |

*Primary Examiner*—Richard C. Queisser
*Assistant Examiner*—Marvin Smollar
*Attorney*—Glenn B. Morse

[57] ABSTRACT

A pair of preferably parallel spaced plates are provided with bearing supports for a torsion bar, and with oppositely-extending crank arms at axially spaced points on the bar. Preferably, the bearings are mounted on one of the plates, and the crank arms engage the other plate. The load is transferred from one plate to the other in such a manner as to generate torsion in the bar, the amount of which is read out by a conventional strain gauge system.

2 Claims, 8 Drawing Figures

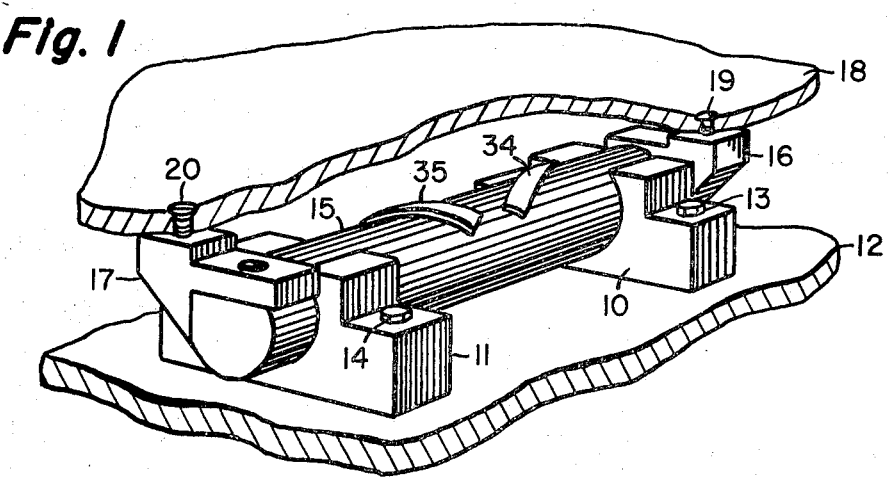
Fig. 1
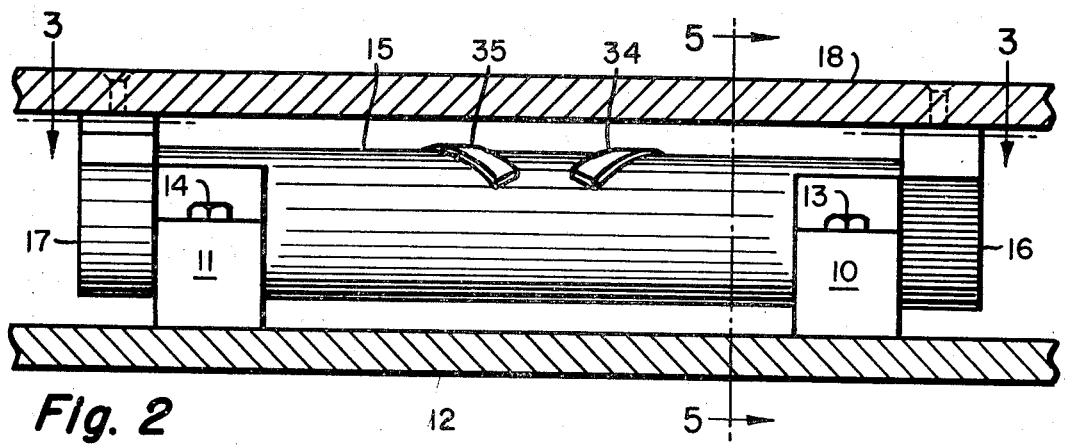
Fig. 2
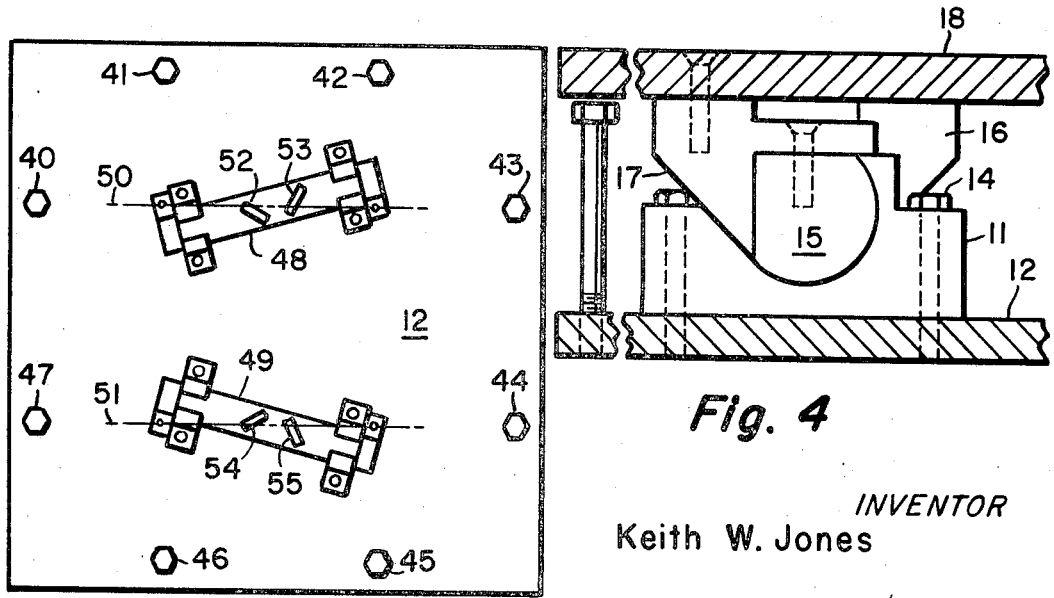
Fig. 3
Fig. 4
INVENTOR
Keith W. Jones
BY
ATTORNEY

LOAD-REGISTRY DEVICE

BACKGROUND OF THE INVENTION

It is common knowledge that the deflection of a member under stress can be detected by an instrument usually referred to as a "strain gauge." A strain gauge system normally includes a detector element secured adhesively to the surface of the member under stress, and the characteristic of the detector element is a variation in electrical properties with variation in elongation. The detector moves with the surface to which it is secured, and thus registers change in conditions that are due to stress. These stress conditions can either be in bending or in torsion. Since deflection under stress can be related directly to applied force, the read-out of a strain gauge can be calibrated so that the entire system can function as a scale to measure load. The present invention utilizes these well-established principles in a particular manner which produces an extremely compact device having very minute deflection from no-load condition in the course of measuring the full range of its scale-registry capability. Devices of this type have been developed by applicant primarily in conjunction with platform scales such as are used to measure the axle load on vehicles.

SUMMARY OF THE INVENTION

In the preferred form of the invention, a torsion bar is provided with oppositely-extending crank arms at its opposite extremities, respectively. The bar is also provided with bearing means disposed closely adjacent to these crank arms. This assembly is interposed between preferably parallel plates, with the crank arms and the adjacent bearing structure engaging respectively opposite plates. In the preferred arrangement, the bearing structure engages one plate, and the crank arms the other. The crank arms are secured to the associated plate with fastenings of a sufficiently light nature that the angular movement of the crank arms is not seriously interfered with by the stiffness of the plate. The torsion bar assemblies are preferably paired, and the readings of the strain gauges associated with the torsion bars are integrated to provide a true load reading.

DESCRIPTION OF THE DRAWINGS

FIG. 1 is a perspective view, partially in section, showing a torsion bar assembly interposed between a top plate and a base plate.

FIG. 2 is a sectional elevation on an enlarged scale on a plane parallel to the axis of the torsion bar.

FIG. 3 is a plan view of the assembly shown in FIG. 1, with the top plate removed, on the plane 3—3 of FIG. 2.

FIG. 4 is a sectional elevation showing an end view of the torsion bar assembly.

DESCRIPTION OF THE PREFERRED EMBODIMENT

Figure 8:
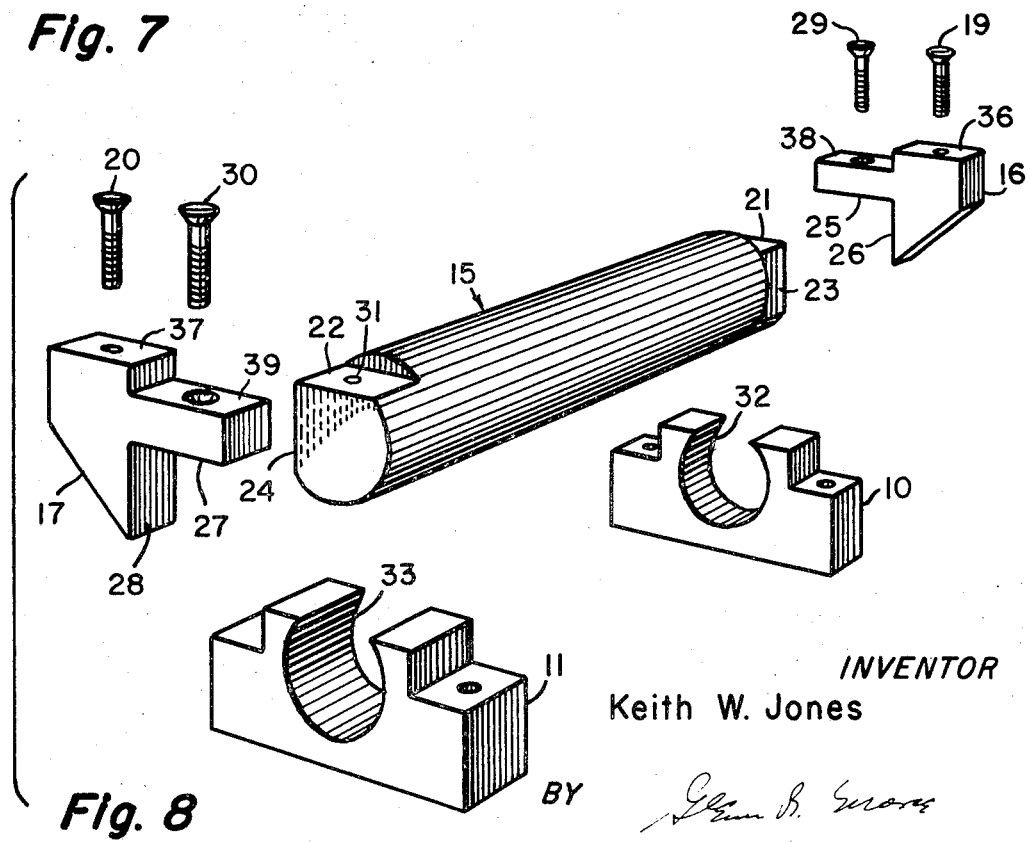
FIG. 8 is an exploded view showing the components of the torsion bar assembly.

Referring to FIGS. 1 and 2, the bearing blocks 10 and 11 are secured to the base plate 12 by bolts as shown at 13 and 14. In the interest of keeping the height of the assembly as low as possible, the bearing blocks are truncated on a plane intersecting the diameter of the cylindrical bearing surface, exposing the top of the torsion bar 15. The crank arms 16 and 17 are secured to the opposite ends of the torsion bar 15, and the top plate 18 is supported by the radially outer extremities of these arms, and is lightly secured at this point by the screws 19 and 20. The details of the torsion bar assembly are best shown in FIG. 8. The bar 15 has a pair of flat surfaces 21 and 22 milled on each end parallel to the plates 12 and 18, and a second set of flats 23 and 24 perpendicular to the flats 21 and 22. The crank arms 16 and 17 have corresponding surfaces 25–26 for engaging the flats 21–23, and 27–28 for engaging the flats 22 and 24. The screws 29 and 30 traverse the arms 16 and 17, and engage threaded holes as shown at 31 in FIG. 8 in the flat surfaces 21 to secure the arms in position. The torsion bar is free to rotate within the cylindrical bearing surfaces 32 and 33. With this arrangement, pressure applied between the plates 12 and 18 will generate opposite torsion moments in the bar 15.

The torsion bar 15 is provided with the strain gauge strips 34 and 35 installed as shown in FIGS. 1 and 2. These are disposed upon helices that intersect at approximately 90 degrees, according to standard practice. The strips themselves are conventional, and are provided with electrical leads (not shown) associating the strips with conventional read-out equipment. Since torsional strain would generate compression and tension along helical patterns, the illustrated disposition of these strips will be directly related to the amount of load placed upon the top plate 18, assuming that the plate 12 (or its equivalent base structure) is properly supported. It is preferable that the bar 15 be constructed of aluminum, or some other metal having substantial strength and a lower coefficient of elasticity than steel. It should be noted that the degree of torsional deflection of the bar under load is minute, and is defined in terms of a few thousandths of an inch movement perpendicular to the plates at the engaging surfaces 36 and 37. These surfaces are isolated from the remainder of the arms by the offsets 38 and 39 to prevent interference with the plates.

In one embodiment of the present invention, the torsion bar 15 was constructed of aluminum rod of one and three-eights inches in diameter, and eight and three-eights inches in overall length. The flat surfaces at the opposite ends occupied five-eights of an inch at each end, which represents the thickness of the crank arms. The distance parallel to the plates from a vertical plane through the axis of the torsion bar to the surfaces 36 and 37 (at the offset) was eleven-sixteenths of an inch in this model, with the surfaces 36 and 37 having a length of five-eights of an inch in the same direction. The solidity of attachment effected by the screws 29 and 30 is relatively weak, being required only to maintain the plate 18 in assembly with the device. In the embodiment referred to above, this screw is a standard ¼-

20 flat-headed machine screw. Obviously, this screw will not have a sufficient degree of strength to induce substantial deflection in the top plate 18, which was aluminum three-eights of an inch thick.

Figure 5:
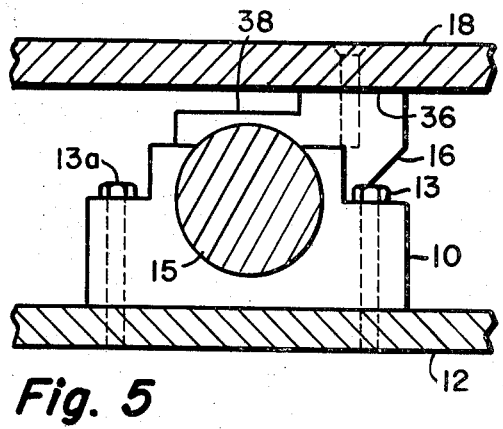
FIG. 5 is a section of the plane 5—5 of FIG. 2.
Figure 6:
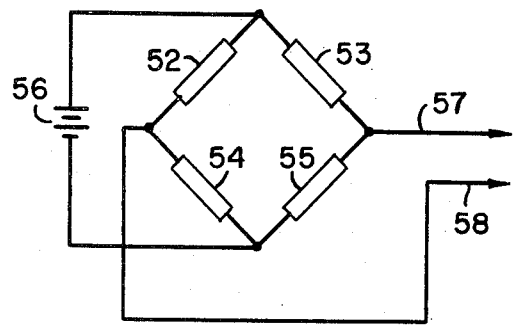
FIG. 6 is a schematic diagram showing the circuit for integrating the reading of the strain gauges associated with the torsion bar system illustrated in FIG. 3.
Figure 7:
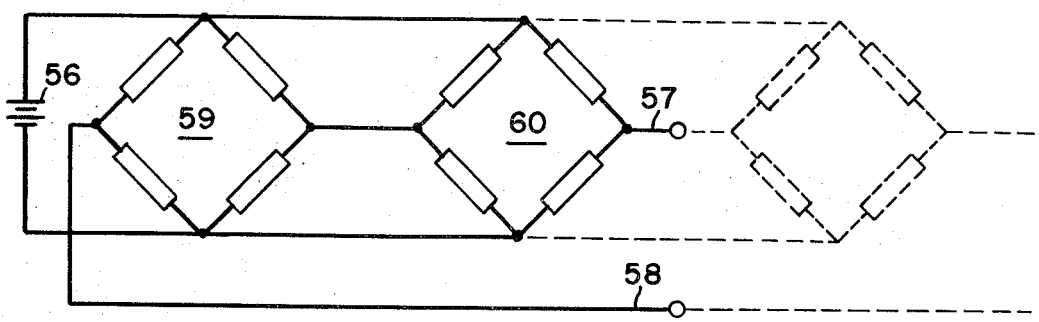
FIG. 7 is a schematic diagram showing the arrangement for interrelating a larger group of strain gauge readings.

It is preferably to include a group of stop bolts 40–47 distributed about the periphery of the base plate 12 to prevent excessive deflection of the top plate under any overload conditions. The preferred arrangement also provides for a pair of torsion bar assemblies to be installed on each base plate, in the arrangement shown in FIG. 3. The assemblies 48 and 49 are each constructed as shown in FIG. 8, and are mounted on the plate 12 in a position such that the point of attatchment of the screws 19 and 20 are disposed on lines 50 and 51 which are parallel. The strain gauges 52–55 of this assembly are interrelated as shown in FIG. 6 to provide a signal to feed to a read-out device. The voltage provided by the battery 56 is subject to the influence of the strain gauges, and delivered via the leads 57 and 58 to a conventional read-out device (not shown). FIG. 7 illustrates the manner in which a group of load-registry devices may be electrically interrelated to integrate the load. The strain gauges associated with the devices 59 and 60, and with any number of other devices as well, may be interconnected as shown to provide a read-out signal. An arrangement such as this can also be used when a larger number of torsion bar assemblies are interposed between a base and top plate.

I claim:

1. Load registry apparatus, comprising
   a. a pair of parallel plates; and
   b. load measuring means for measuring the compressive force applied in a normal direction between said parallel plates, said load measuring means including
      1. a cylindrical torsion bar disposed between said parallel plates, said torsion bar having first flat surfaces normally parallel to said plates at each end thereof and second flat surfaces normal to and adjacent said first flat surfaces,
      2. bearing means rotatably securing said torsion bar to one of said plates, said bearing means including first and second brackets secured to one of said plates adjacent the ends of said torsion bar, respectively,
      3. strain responsive means mounted on said torsion bar for measuring the amount of torsion applied to said torsion bar,
      4. a pair of oppositely extending cranks laterally disposed between said plates and engaged with said first and second flat surfaces at each end of said torsion bar, respectively, said cranks being secured to said first flat surfaces by screw means, each said crank having a plate engaging surface offset laterally from the longitudinal axis of said torsion bar and fixed in orientation with respect to the associated end of said torsion bar, and
      5. flexible connective means for securing said plate engaging surfaces in fixed direct contact with the other said plate to cause compressive forces to pass from said other plate directly into said cranks, whereby said connecting means are flexed when compressive loads are applied to said plates thereby to allow said cranks to be urged in opposite rotational directions to produce a measurable force couple in said torsion bar proportional to the compressive load forces applied to said plates.

2. Load registry apparatus as defined in claim 1, wherein said load measuring means further includes a second cylindrical torsion bar and associated bearing means, strain responsive means, cranks and flexible connective means, said cranks on each torsion bar engage said other plate at points disposed on a line parallel to a line connecting said points associated with the other said torsion bar.

* * * * *